(12) United States Patent
Dulai et al.

(10) Patent No.: US 12,291,180 B2
(45) Date of Patent: May 6, 2025

(54) TRAILER BRAKING ENHANCEMENT

(71) Applicant: GM GLOBAL TECHNOLOGY OPERATIONS LLC, Detroit, MI (US)

(72) Inventors: Manvir Dulai, Brampton (CA); Michael Alarcon, Markham (CA); Ralph David Schlottke, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 464 days.

(21) Appl. No.: 17/659,908

(22) Filed: Apr. 20, 2022

(65) Prior Publication Data

US 2023/0339439 A1    Oct. 26, 2023

(51) Int. Cl.
*B60T 7/20* (2006.01)
*B60T 8/17* (2006.01)
*B60T 8/32* (2006.01)

(52) U.S. Cl.
CPC .............. *B60T 7/20* (2013.01); *B60T 8/1708* (2013.01); *B60T 8/323* (2013.01); *B60T 2220/04* (2013.01); *B60T 2250/04* (2013.01)

(58) Field of Classification Search
CPC .......... B60T 7/20; B60T 8/1708; B60T 8/323; B60T 2220/04; B60T 2250/04; B60T 7/042; B60T 13/662; B60T 7/06; B60T 17/18
See application file for complete search history.

(56) References Cited

U.S. PATENT DOCUMENTS

| | | | |
|---|---|---|---|
| 2007/0001509 A1* | 1/2007 | Brown | B60T 8/1708 303/123 |
| 2015/0336548 A1* | 11/2015 | Morselli | B60T 7/20 701/70 |
| 2015/0353063 A1* | 12/2015 | Tuhro | B60T 8/1708 701/70 |
| 2017/0221281 A1* | 8/2017 | Hecht | B60T 7/042 |
| 2017/0259794 A1* | 9/2017 | Binder | B60T 8/172 |
| 2018/0215358 A1* | 8/2018 | Hall | B60T 8/3205 |
| 2018/0339685 A1* | 11/2018 | Hill | B60T 13/662 |
| 2019/0084533 A1* | 3/2019 | Kasper | B60T 13/683 |
| 2020/0010061 A1* | 1/2020 | Tiwari | B60W 10/192 |
| 2021/0139008 A1* | 5/2021 | DiGioacchino | B60T 8/1708 |
| 2021/0284117 A1* | 9/2021 | Boulivan | B60T 8/176 |
| 2023/0192069 A1* | 6/2023 | Marx | B60W 10/20 701/41 |

* cited by examiner

*Primary Examiner* — Donald J Wallace
(74) *Attorney, Agent, or Firm* — Lorenz & Kopf LLP

(57) ABSTRACT

In exemplary embodiments, methods and systems are provided for controlling braking of a trailer that is coupled to a vehicle. In an exemplary embodiment, a system is provided that includes: one or more sensors configured to obtain sensor data for a vehicle coupled to a trailer, the sensor data including: a measure of engagement of a brake pedal of the vehicle; and a deceleration of the vehicle; and a processor that is coupled to the one or more sensors and that is configured to at least facilitate dynamically controlling braking of the trailer, via instructions provided by the processor to a braking system of the trailer, based on both the measure of engagement of the brake pedal and the deceleration of the vehicle.

20 Claims, 5 Drawing Sheets

TRAILER BRAKING ENHANCEMENT

INTRODUCTION

The technical field generally relates to vehicles and, more specifically, to methods and systems for controlling braking of a trailer coupled to a vehicle.

Certain vehicles today include functionality for towing a trailer that is coupled to the vehicle. Certain of these vehicles also include functionality for controlling braking of a trailer that is coupled to the vehicle. However, existing vehicles may not always optimally control the braking of the trailer, for example in providing optimal comfort and easer for the driver of the vehicle at various different speeds and conditions.

Accordingly, it is desirable to provide improved methods and systems for controlling braking of a trailer that is coupled to a vehicle. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is provided that includes: obtaining sensor data via one or more sensors of a vehicle coupled to a trailer, the sensor data including: a measure of engagement of a brake pedal of the vehicle; and a deceleration of the vehicle; and dynamically controlling braking of the trailer, via instructions provided by a processor of the vehicle to a braking system of the trailer, based on both the measure of engagement of the brake pedal and the deceleration of the vehicle.

Also in an exemplary embodiment, the step of obtaining the sensor data further includes obtaining the sensor data including a brake pedal position percentage of the brake pedal of the vehicle; and the step of dynamically controlling the braking of the trailer includes controlling braking of the trailer, via instructions provided by the processor of the vehicle to the braking system of the trailer, based on both the brake pedal position percentage and the deceleration of the vehicle.

Also in an exemplary embodiment, the step of dynamically controlling the braking of the trailer includes dynamically controlling a trailer brake duty cycle to be proportional to the brake pedal position percentage up to a predetermined brake pedal position percentage, with a slope that is dependent upon the deceleration of the vehicle.

Also in an exemplary embodiment, the step of obtaining the sensor data further includes obtaining the sensor data including a steering angle of a steering wheel of the vehicle; and the step of dynamically controlling the braking of the trailer includes controlling braking of the trailer, via instructions provided by the processor of the vehicle to the braking system of the trailer, based on each of the following: the brake pedal position percentage, the deceleration of the vehicle, and the steering angle of the vehicle.

Also in an exemplary embodiment, the step of obtaining the sensor data further includes obtaining the sensor data including a speed of the vehicle; and the step of dynamically controlling the braking of the trailer includes controlling braking of the trailer, via instructions provided by the processor of the vehicle to the braking system of the trailer, based on each of the following: the brake pedal position percentage, the deceleration of the vehicle, and the speed of the vehicle.

Also in an exemplary embodiment, the step of obtaining the sensor data further includes obtaining the sensor data including a grade of a path on which the vehicle is travelling; and the step of dynamically controlling the braking of the trailer includes controlling braking of the trailer, via instructions provided by the processor of the vehicle to the braking system of the trailer, based on each of the following: the brake pedal position percentage, the deceleration of the vehicle, and the grade of the path on which the vehicle is travelling.

Also in an exemplary embodiment, the step of obtaining the sensor data further includes obtaining the sensor data including a steering angle of a steering wheel of the vehicle, a speed of the vehicle, and a grade of a path on which the vehicle is travelling; and the step of dynamically controlling the braking of the trailer includes controlling braking of the trailer, via instructions provided by the processor of the vehicle to the braking system of the trailer, based on each of the following: the brake pedal position percentage, the deceleration of the vehicle, the steering angle of the vehicle, the speed of the vehicle, and the grade of the path on which the vehicle is travelling.

Also in an exemplary embodiment, the step of dynamically controlling the braking of the trailer includes dynamically controlling a trailer brake duty cycle to be proportional to the brake pedal position percentage up to a predetermined brake pedal position percentage, with a slope that is dependent upon the deceleration of the vehicle, provided that each of the following has occurred: the steering angle is less than a first predetermined threshold; the speed of the vehicle is less than a second predetermined threshold; and the grade of the path is less than a third predetermined threshold.

Also in an exemplary embodiment, the method further includes: determining, via the processor, a trailer braking gain; wherein the step of dynamically controlling the trailer brake duty cycle includes dynamically controlling the trailer brake duty cycle to be proportional to the brake pedal position percentage up to the predetermined brake pedal position percentage to reach a maximum trailer brake duty cycle, with the slope that is dependent upon the deceleration of the vehicle, and wherein the maximum trailer brake duty cycle is based on the trailer braking gain.

In another exemplary embodiment, a system is provided that includes: one or more sensors configured to obtain sensor data for a vehicle coupled to a trailer, the sensor data including: a measure of engagement of a brake pedal of the vehicle; and a deceleration of the vehicle; and a processor that is coupled to the one or more sensors and that is configured to at least facilitate dynamically controlling braking of the trailer, via instructions provided by the processor to a braking system of the trailer, based on both the measure of engagement of the brake pedal and the deceleration of the vehicle.

Also in an exemplary embodiment, the sensor data includes a brake pedal position percentage of the brake pedal of the vehicle; and the processor is further configured to at least facilitate controlling braking of the trailer, via instructions provided by the processor of the vehicle to the braking system of the trailer, based on both the brake pedal position percentage and the deceleration of the vehicle.

Also in an exemplary embodiment, the processor is further configured to at least facilitate dynamically controlling a trailer brake duty cycle to be proportional to the brake pedal position percentage up to a predetermined brake pedal position percentage, with a slope that is dependent upon the deceleration of the vehicle.

Also in an exemplary embodiment, the sensor data includes obtaining the sensor data including a steering angle of a steering wheel of the vehicle; and the processor is further configured to at least facilitate controlling braking of the trailer, via instructions provided by the processor of the vehicle to the braking system of the trailer, based on each of the following: the brake pedal position percentage, the deceleration of the vehicle, and the steering angle of the vehicle.

Also in an exemplary embodiment, the sensor data includes obtaining the sensor data including a speed of the vehicle; and the processor is further configured to at least facilitate controlling braking of the trailer, via instructions provided by the processor of the vehicle to the braking system of the trailer, based on each of the following: the brake pedal position percentage, the deceleration of the vehicle, and the speed of the vehicle.

Also in an exemplary embodiment, the sensor data includes obtaining the sensor data including a grade of a path on which the vehicle is travelling; and the processor is further configured to at least facilitate controlling braking of the trailer, via instructions provided by the processor of the vehicle to the braking system of the trailer, based on each of the following: the brake pedal position percentage, the deceleration of the vehicle, and the grade of the path on which the vehicle is travelling.

Also in an exemplary embodiment, the sensor data includes obtaining the sensor data including a steering angle of a steering wheel of the vehicle, a speed of the vehicle, and a grade of a path on which the vehicle is travelling; and the processor is further configured to at least facilitate controlling braking of the trailer, via instructions provided by the processor of the vehicle to the braking system of the trailer, based on each of the following: the brake pedal position percentage, the deceleration of the vehicle, the steering angle of the vehicle, the speed of the vehicle, and the grade of the path on which the vehicle is travelling.

Also in an exemplary embodiment, the processor is further configured to at least facilitate dynamically controlling a trailer brake duty cycle to be proportional to the brake pedal position percentage up to a predetermined brake pedal position percentage, with a slope that is dependent upon the deceleration of the vehicle, provided that each of the following has occurred: the steering angle is less than a first predetermined threshold; the speed of the vehicle is less than a second predetermined threshold; and the grade of the path is less than a third predetermined threshold.

Also in an exemplary embodiment, the processor is further configured to at least facilitate: determining a trailer braking gain; and dynamically controlling the trailer brake duty cycle to be proportional to the brake pedal position percentage up to the predetermined brake pedal position percentage to reach a maximum trailer brake duty cycle, with the slope that is dependent upon the deceleration of the vehicle, and wherein the maximum trailer brake duty cycle is based on the trailer braking gain.

In another exemplary embodiment, a vehicle is provided that includes: a body configured to be coupled to a trailer having a trailer braking system; a brake pedal; one or more sensors configured to obtain sensor data for the vehicle, the sensor data including: a measure of engagement of a brake pedal of the vehicle; and a deceleration of the vehicle; and a processor that is coupled to the one or more sensors and that is configured to at least facilitate dynamically controlling braking of the trailer, via instructions provided by the processor to a braking system of the trailer, based on both the measure of engagement of the brake pedal and the deceleration of the vehicle.

Also in an exemplary embodiment, the sensor data includes a brake pedal position percentage of the brake pedal of the vehicle; and the processor is further configured to at least facilitate controlling braking of the trailer by dynamically controlling a trailer brake duty cycle to be proportional to the brake pedal position percentage up to a predetermined brake pedal position percentage, with a slope that is dependent upon the deceleration of the vehicle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
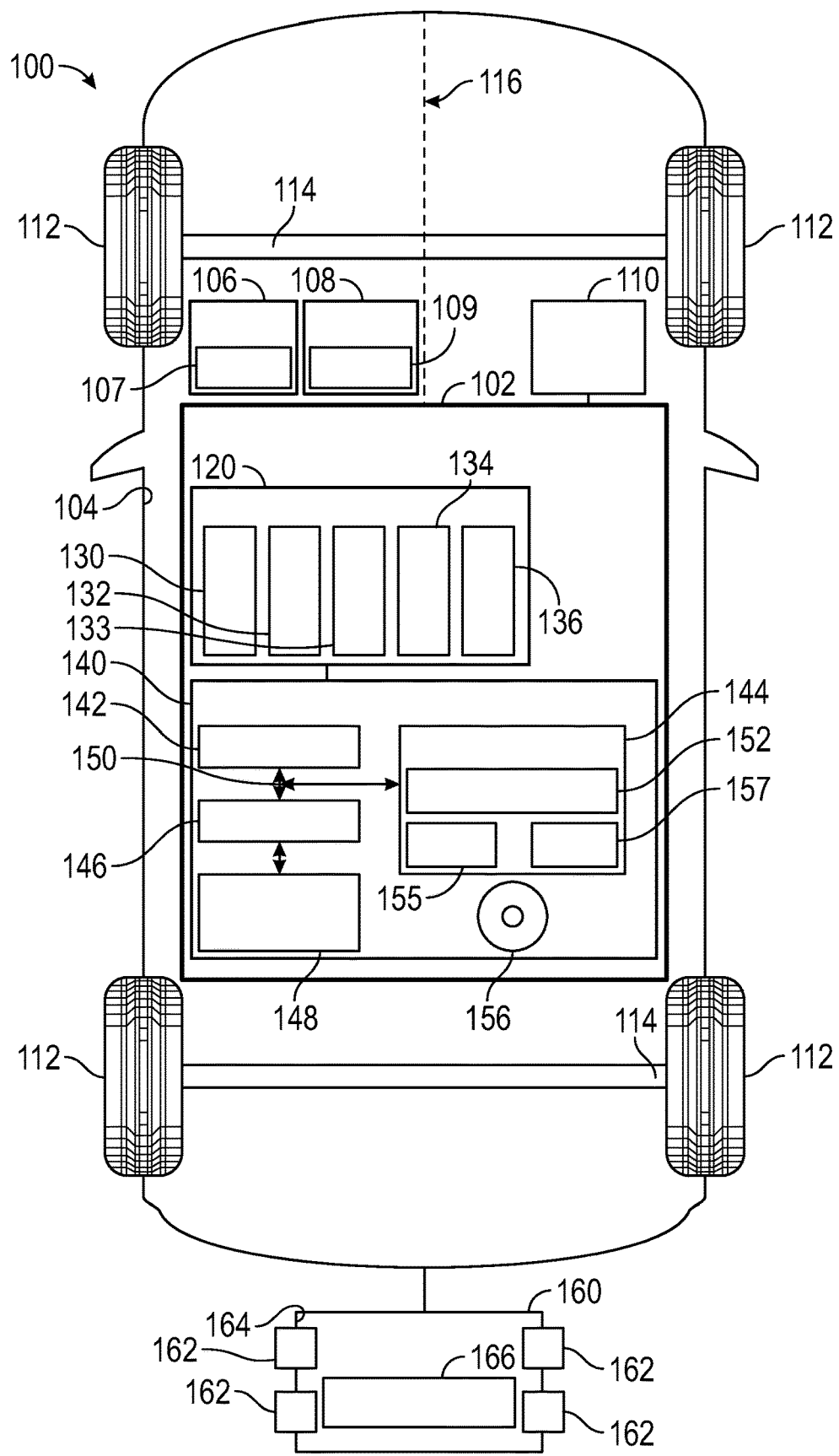
FIG. 1 is a functional block diagram of a vehicle that is coupled to a trailer having a trailer braking system, and wherein the vehicle includes a control system for controlling braking of the trailer via the trailer braking system over a variety of different speeds and conditions, in accordance with exemplary embodiments.

FIG. 1 illustrates a vehicle 100 that is configured to be coupled to a trailer 160, according to an exemplary embodiment. As described in greater detail further below, the vehicle 100 includes a control system 102 that is configured for controlling braking of the trailer over a variety of different speeds and conditions, in accordance with exemplary embodiments. Specifically, as explained in greater detail further below, in various embodiments the control system 102 provides additional and more immediate trailer braking when more significant trailer braking is needed on an urgent basis (i.e., when the vehicle deceleration is relatively larger), but otherwise provides for a potentially smoother braking experience when more significant trailer braking is not need on an urgent basis (i.e., when the vehicle deceleration is relatively smaller).

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

Also in various embodiments, the trailer 160 may comprise any number of different types of trailers and/or other types of mobile platforms, for example that are coupled to the vehicle 100 and move along with the vehicle 100. As depicted in FIG. 1, in various embodiments, the trailer 160 includes, among other features, a plurality of wheels 162, a body 164, and a braking system 166. While the trailer 160 is depicted in FIG. 1 as having four wheels 162, it will be appreciated that the number of wheels 162 may vary in different embodiments.

As depicted in FIG. 1, the vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. In certain embodiments, the drive system 110 comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, the vehicle also includes a braking system 106 and a steering system 108 in various embodiments. In exemplary embodiments, the braking system 106 controls braking of the vehicle 100 using braking components that are controlled via inputs provided by a driver, such as a brake pedal 107 as depicted in FIG. 1, and in certain embodiments, also via automatic control via the control system 102. Also in exemplary embodiments, the steering system 108 controls steering of the vehicle 100 via steering components, such as a steering wheel 109 as depicted in FIG. 1 (e.g., in connection with a steering column coupled to the axles 114 and/or the wheels 112) that are controlled via inputs provided by a driver (e.g., via the steering wheel) 108), and in certain embodiments also via automatic control via the control system 102.

In the embodiment depicted in FIG. 1, the control system 102 is coupled to the braking system 106 and the steering system 108 of the vehicle 100, as well as to the braking system 166 of the trailer 160. In various embodiments, the control system 102 may also be coupled to one or more other systems and/or components of the vehicle 100 and/or the trailer 160. Also as depicted in FIG. 1, in various embodiments, the control system 102 includes a sensor array 120 and a controller 140.

In various embodiments, the sensor array 120 includes various sensors that obtain sensor data for use in controlling braking for the vehicle 100 as well as for the trailer 160, among other potential functionality for the vehicle 100 and/or the trailer 160. In the depicted embodiment, the sensor array 120 includes one or more braking sensors 130, steering sensors 132, speed sensors 133, inertial measurement unit (IMU) sensors 134, and detection sensors 136.

In various embodiments, the braking sensors 130 are coupled to the braking system 106 of the vehicle 100, and measure an amount of braking relating thereto. In certain embodiments, the braking sensors 130 are coupled to the brake pedal 107, and measure an amount of engagement thereof by a driver of the vehicle 100 (e.g., a measured amount of brake pedal travel and/or brake pedal force of the brake pedal 107 and/or applied thereto based on engagement of the brake pedal 107 by the driver). In addition, in certain embodiments, the braking sensors 130 may also include one or more additional braking sensors 130, such as one or more input braking sensors configured to detect user inputs desired for an adaptive trailer braking setting (e.g., including, in one embodiment, capacitive touch sensors for detecting a user's preferences as to one or more trailer braking gains, and so on).

Also in various embodiments, the steering sensors 132 are coupled to the steering system 108 of the vehicle 100, and measure an indication of steering relating thereto. In certain embodiments, the steering sensors 132 are coupled to the steering wheel 109, and measure an angle of the steering wheel 109 resulting from engagement of the steering wheel 109 by the driver.

In various embodiments, the speed sensors 133 measure an amount of speed (and/or changes thereof) of the vehicle 100. In certain embodiments, the speed sensors 133 comprise wheel speed sensors that measure a speed of one or more of the wheels 112 of the vehicle 100. In certain other embodiments, the speed sensors 133 may comprise one or more accelerometers and/or one or more other types of sensors that measure parameters pertaining to movement of the vehicle 100.

In various embodiments, the inertial measurement unit (IMU) sensors 134 measure inertial measurement data and/or related parameters for the vehicle 100, including a grade and/or slope on which the vehicle 100 is travelling. In certain embodiments, the IMU sensors 134 are part of and/or to an inertial measurement unit (IMU) of the vehicle. Also in certain embodiments, the IMU sensors 134 include one or more gyroscopes.

In addition, in various embodiments, the detection sensors 136 detect objects (e.g., other vehicles and/or other types of objects) in proximity to the vehicle 100. In certain embodiments, the detection sensors 136 include one or cameras, radar, lidar, sonar, and/or other types of sensors that are configured to detect such objects, including objects in front of the vehicle 100 and/or otherwise that are within and/or proximate a direction of travel of the vehicle. In certain embodiments, the detection sensors 136 are part of an impact warning system (e.g., a front impact warning system) of the vehicle 100.

In various embodiments, the controller 140 is coupled to the sensor array 120, the braking system 106 of the vehicle 100, and the braking system 166 of the trailer 160. In certain embodiments, the controller 140 may also be coupled to the steering system 108, the drive system 110, and/or one or more other systems, devices, and/or components of the vehicle 100 and/or trailer.

In various embodiments, the controller 140 receives sensor data from the sensor array 120, processes the sensor data, and controls braking of the vehicle 100 and of the trailer 160 (via the vehicle braking system 106 and the trailer braking system 166, respectively) based on the processing of the sensor data, such as described further below in connection with the process 200 of FIG. 2 and the implementations of FIGS. 3-5. In addition, in certain embodiments, the controller 140 may also control steering, propulsion, and/or other vehicle functionality via the steering system 108, the drive system 110, and/or other systems, devices, and/or components of the vehicle 100 and/or the trailer 160.

In various embodiments, the controller 140 comprises a computer system (also referred to herein as computer system 140), and includes a processor 142, a memory 144, an interface 146, a storage device 148, and a computer bus 150. In various embodiments, the controller (or computer system) 140 controls vehicle and trailer operation, including braking for the trailer 160. In various embodiments, the controller 140 provides these and other functions in accordance with the steps of the process 200 of FIG. 2 and the implementation of FIGS. 3-5.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIG. 2 and the implementation of FIGS. 3-5 and described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more tables 155 and other stored values 157, including for control of the trailer 160 based on the processing of the sensor data that is obtained from the sensor array 120.

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 of FIG. 2 and the implementations of FIGS. 3-5 and described further below in connection therewith. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
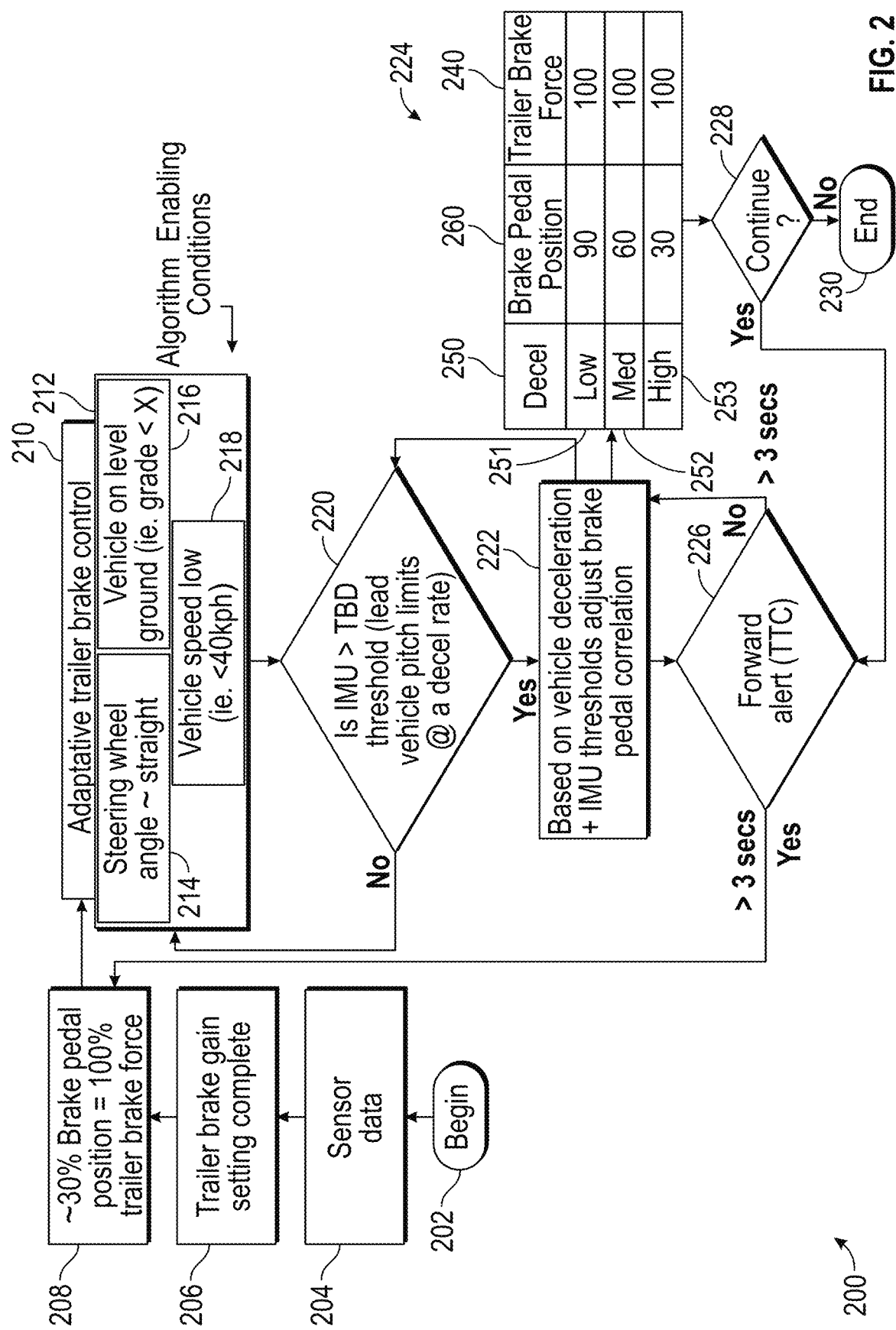
FIG. 2 is a flowchart of process for controlling braking of a trailer that is coupled to a vehicle over a variety of different speeds and conditions, in accordance with exemplary embodiments, and that can be implemented in connection with the vehicle and control system of FIG. 1.

FIG. 2 provides a flowchart of process 200 for controlling braking of a trailer that is coupled to a vehicle over a variety of different speeds and conditions, in accordance with exemplary embodiments. Specifically, as described in greater detail further below, the process 200 provides additional and more immediate trailer braking when more significant trailer braking is needed on an urgent basis (i.e., when the vehicle deceleration is relatively larger), but otherwise provides for a potentially smoother braking experience when more significant trailer braking is not need on an urgent basis (i.e., when the vehicle deceleration is relatively smaller).

In various embodiments, the process 200 may be implemented in connection with the vehicle 100, the control system 102 and braking system 106 thereof, the trailer 160 and the braking system 166 thereof, and components thereof. The process 200 is also described further below in connection with FIGS. 3-5, which depict exemplary implementations of the process of FIG. 2, and that incorporate different gains for the trailer braking, in accordance with exemplary embodiments.

As depicted in FIG. 2, the process 200 begins at step 202. In one embodiment, the process 200 begins when a vehicle is turned "on" or begins operation, for example during a current vehicle drive or ignition cycle. For example, in various embodiments, the process 200 may also begin when a driver approaches or enters the vehicle 100, or when the driver turns on the vehicle and/or an ignition therefor (e.g. by turning a key, engaging a keyfob or start button, and so on). In one embodiment, the steps of the process 200 are performed continuously during operation of the vehicle.

Sensor data is obtained at step 204. In various embodiments, sensor data is obtained via each of the sensors of the vehicle's sensor array 120 of FIG. 1. In certain embodiments, the sensor data of step 204 includes the following: (i) braking data from the one or more braking sensors 130 of FIG. 1 (e.g., as to one or more measures of braking, such as brake pedal travel and/or brake pedal force); (ii) steering data from the one or more steering sensors 132 of FIG. 1 (e.g., as to a steering wheel angle for the vehicle 100); (iii) speed sensor data from the one or more speed sensors 133 (e.g., as to one or more measures of speed and/or acceleration of the vehicle 100); (iv) inertial measurement data from the one or more IMU sensors 134 of FIG. 1 (e.g., as to a grade and/or slope on which the vehicle 100 is travelling); and (v) detection sensor data from the one or more detection sensors 136 of FIG. 1 (e.g., as to any detected objects in front of or otherwise in proximity to the vehicle 100 that may come into contact with the vehicle 100). In certain embodiments, the sensor data may also include one or more detected user inputs, for example from one or more input braking sensors as to a user's preference for one or more trailer brake settings (e.g., user inputs as to a user's preferences as to one or more trailer braking gains, and so on).

Also in certain embodiments, during steps 206, a trailer brake gain setting is established. In various embodiments, the trailer brake gain setting represents an initial setting of trailer brake gain as a function of the vehicle braking. In various embodiments, the trailer brake gain setting is established by the processor 142 of FIG. 1. In certain embodiments, the trailer brake gain is set in accordance to a pre-determined amount in step 206, for example as stored in the memory 144 of FIG. 1 as one of the stored values 157 thereof. In one example, the trailer brake gain may be set to approximately thirty percent (30%); however, this may vary in other embodiments. In certain embodiments, the gain setting may be set in the vehicle, such as in an integrated trailer brake module. In addition, in certain embodiments, this may be set prior to the beginning of the process 200 of FIG. 2.

In various embodiments, initial trailer brake control is initiated at step 208. In various embodiments, during step 208, the initial trailer brake control is initiated in an initial or "default" state (i.e., before adaptive trailer braking is initiated in step 210 below) via instructions by the processor 142 of FIG. 1 to the trailer braking system 166 of FIG. 1 based on both (i) the braking sensor data of step 204; and (ii) the trailer brake gain setting established in step 206. For example, in one exemplary embodiment in which a thirty percent (30%) trailer brake gain setting is established in step 206, the initial (or "default") trailer brake control of step 208 is initiated as a function of the brake pedal engagement (e.g., brake pedal position or travel) with the thirty percent gain (30%) applied such that a movement of the brake pedal to thirty percent (30%) of its maximum position results in one hundred percent (100%) of the maximum braking force of the trailer braking system 166, and so on. It will be appreciated that the "thirty percent" gain for the initial or "default" settings may differ in various embodiments. In addition, as set forth in greater detail below, beginning with step 210 below, the percent pedal position utilization will vary, and will be dependent upon the deceleration of the vehicle.

Adaptive trailer brake control is initiated at step 210. In various embodiments, the adaptive trailer brake control differs from the initial trailer brake control of step 208 in a manner that is dynamically tailored to various other sensor data, such as the steering angle, grade of the roadway, vehicle speed, and vehicle deceleration. Also in various embodiments, the adaptive trailer brake control is initiated in accordance with instructions provided by the processor 142 of FIG. 1 based on a plurality of conditions 212 based on the sensor data of step 204. Specifically, in the depicted embodiment of FIG. 1, the adaptive trailer brake control is initiated based on the following enabling conditions for the algorithm: (i) whether the steering wheel angle is approximately straight (condition 214); (ii) whether the vehicle is operating on an approximately level ground (condition 216); and (iii) whether the vehicle speed is sufficiently low (condition 218).

In various embodiments, the first condition 214 is satisfied when the steering angle of the steering wheel (as measured by one or more steering angle sensors 132 of FIG. 1) is less than a first predetermined threshold. In certain embodiments, the first predetermined threshold is calibratable. In certain non-limiting examples, the first predetermined threshold may be plus or minus thirty degrees of steering wheel angle. However, this may vary in other embodiments, and may also be changed, tuned, and/or calibrated in various embodiments.

Also in various embodiments, the second condition 216 is satisfied when a grade of a road or bath on which the vehicle 100 is operating (as measured by one or more IMU sensors 134 of FIG. 1) is less than a second predetermined threshold. In certain embodiments, the second predetermined threshold is calibratable. In certain non-limiting examples, the first predetermined threshold may be plus or minus three degrees of the grade. However, this may vary in other embodiments, and may also be changed, tuned, and/or calibrated in various embodiments.

In addition, in various embodiments, the third condition 218 is satisfied when a vehicle speed is less than a third predetermined threshold. In one embodiment, the third predetermined threshold is equal to approximately forty kilometers per hour (kph); however, this may vary in other embodiments.

In various embodiments, a determination is made at step 220 as to whether each of the above-described conditions 214, 216, and 218 are satisfied. In various embodiments, these determinations are made by the processor 142 of FIG. 1 based on the sensor data of step 204. In various embodiments, if it is determined that one or more of the conditions 214, 216, and/or 218 are not satisfied, then each of the conditions 214, 216, and 218 continue to be re-evaluated using updated sensor data until a determination is made during an iteration of step 220 that each of the conditions 214, 216, and 218 are satisfied. In various embodiments, once it is determined during an iteration of step 220 that each of the conditions 214, 216, and 218 are satisfied, the process then proceeds to step 222, described directly below.

In various embodiments, during step 222, the trailer brake control is dynamically adjusted based on one or more vehicle parameter values. Specifically, in various embodiments, the brake pedal correlation for the trailer braking is adjusted by the processor 142 of FIG. 1 based on the vehicle deceleration. In various embodiments, the processor 142 may require a relatively larger magnitude of engagement of the brake pedal for a particular corresponding level of trailer braking (as compared with the initial trailer braking of step 208) when vehicle deceleration is relatively low, for example, in order to provide a more comfortable and even braking experience for the driver. Conversely, also in various embodiments, the processor 142 may require a relatively smaller magnitude of engagement of the brake pedal for a particular corresponding level of trailer braking when vehicle deceleration is relatively high, for example, in order to provide more trailer braking when it is urgently needed.

In certain exemplary embodiments, the processor 142 utilizes a look-up table 224 for determining the brake pedal correlation based on the vehicle deceleration, provided that the three conditions 214, 216, and 218 remain satisfied. In certain embodiments, the look-up table 224 is stored in the memory 144 of FIG. 1 as one of the tables 155 thereof.

In addition, in various embodiments, the look-up table 224 provides a trailer braking force 240 for a plurality of different deceleration 250 ranges and brake pedal positions 260. For example, in one exemplary embodiment depicted in FIG. 2: (i) when the vehicle deceleration 250 is in a "low" range 251, a ninety percent (90%) brake pedal position 260 corresponds to a one hundred percent (100%) trailer braking force 240; (ii) when the vehicle deceleration 250 is in a "medium" range 252, a sixty percent (60%) brake pedal position 260 corresponds to a one hundred percent (100%) trailer braking force 240; and (iii) when the vehicle deceleration 250 is in a "high" range 253, a thirty percent (30%) brake pedal position 260 corresponds to a one hundred percent (100%) trailer braking force 240. It will be appreciated that these ranges and values may differ in various embodiments.

Also in various embodiments, a determination is made as to whether an alert is provided as to possible contact with another object (step 226). In certain a determination is made as to whether a time to contact with another vehicle or another object is less than a predetermined threshold. In one exemplary embodiment, such a threshold may be equal to approximately three seconds (3 sec); however, this may vary in other embodiments. Also in certain embodiments, the determination of step 226 is made by the processor 142 of FIG. 1 using a predetermined threshold stored in the memory 144 of FIG. 1 as a stored value 157 thereof. In certain embodiments, this determination is made as part of a forward event detection function of the vehicle 100, with respect to other vehicles and/or other objects that may contact a front portion of the vehicle 100. However, this may vary in other embodiments.

In various embodiments, if it is determined during step 226 that an alert is provided as to possible contact with another object, then the adjusted trailer braking of step is terminated, and instead the previous, initial trailer braking of step 208 is reinstated. In various embodiments, the conditions 212 continue to be analyzed in a new iteration of step 210, and the initial trailer braking of step 208 continues until both (a) the alert of step 226 is no longer active; and (b) the various conditions 214, 216, and 216 are satisfied (after which point the process returns to steps 220 and 222).

Conversely, in various embodiments, when it is determined during step 226 that an alert is not provided as to possible contact with another object, the adaptive trailer braking continues. Specifically, in various embodiments, the adaptive trailer braking of step 222 is continued (e.g., using one or more look-up tables 224 based on the deceleration range and the brake pedal position for the vehicle 100 in various embodiments).

Also in various embodiments, a determination is made during step 228 as to whether the process is to continue. For example, in certain embodiments, the process is determined to continue if the vehicle 100 of FIG. 1 continues to be turned "on", operated by a driver during a current vehicle drive and/or ignition cycle, and/or continues to have adaptive trailer braking functionality activated, or the like. In various embodiments, this determination is made by the processor 142 of FIG. 1. Also in various embodiments, when it is determined that the process is to continue, the process continues accordingly (e.g., by returning to steps 226 and/or 222 in certain embodiments). Conversely, in various embodiments, when it is determined that the process is not to continue, the process then terminates at step 230.

Figure 3:
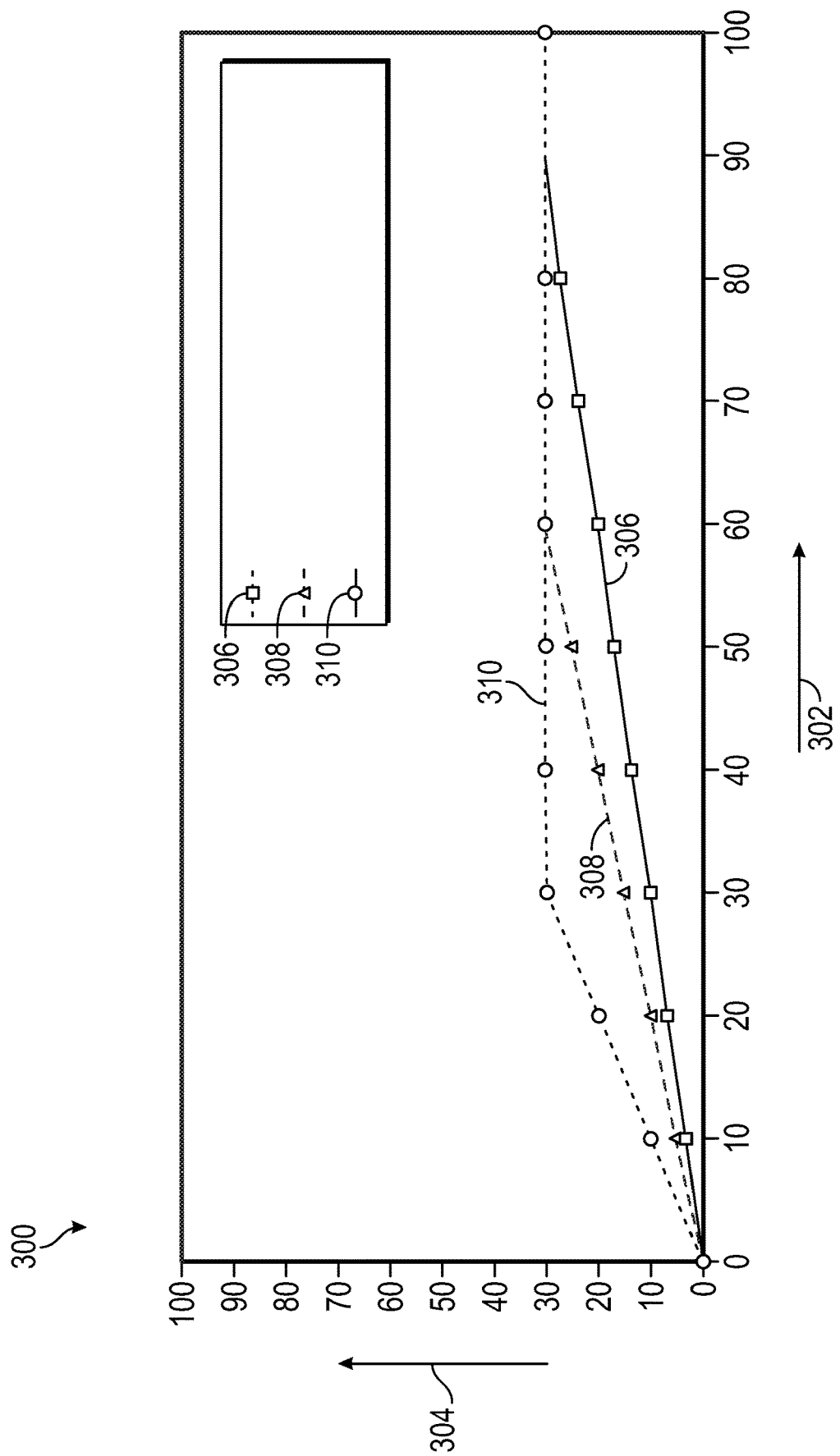
FIGS. 3-5 depict exemplary implementations of the process of FIG. 2, and that incorporate different gains for the trailer braking, in accordance with exemplary embodiments.
Figure 4:
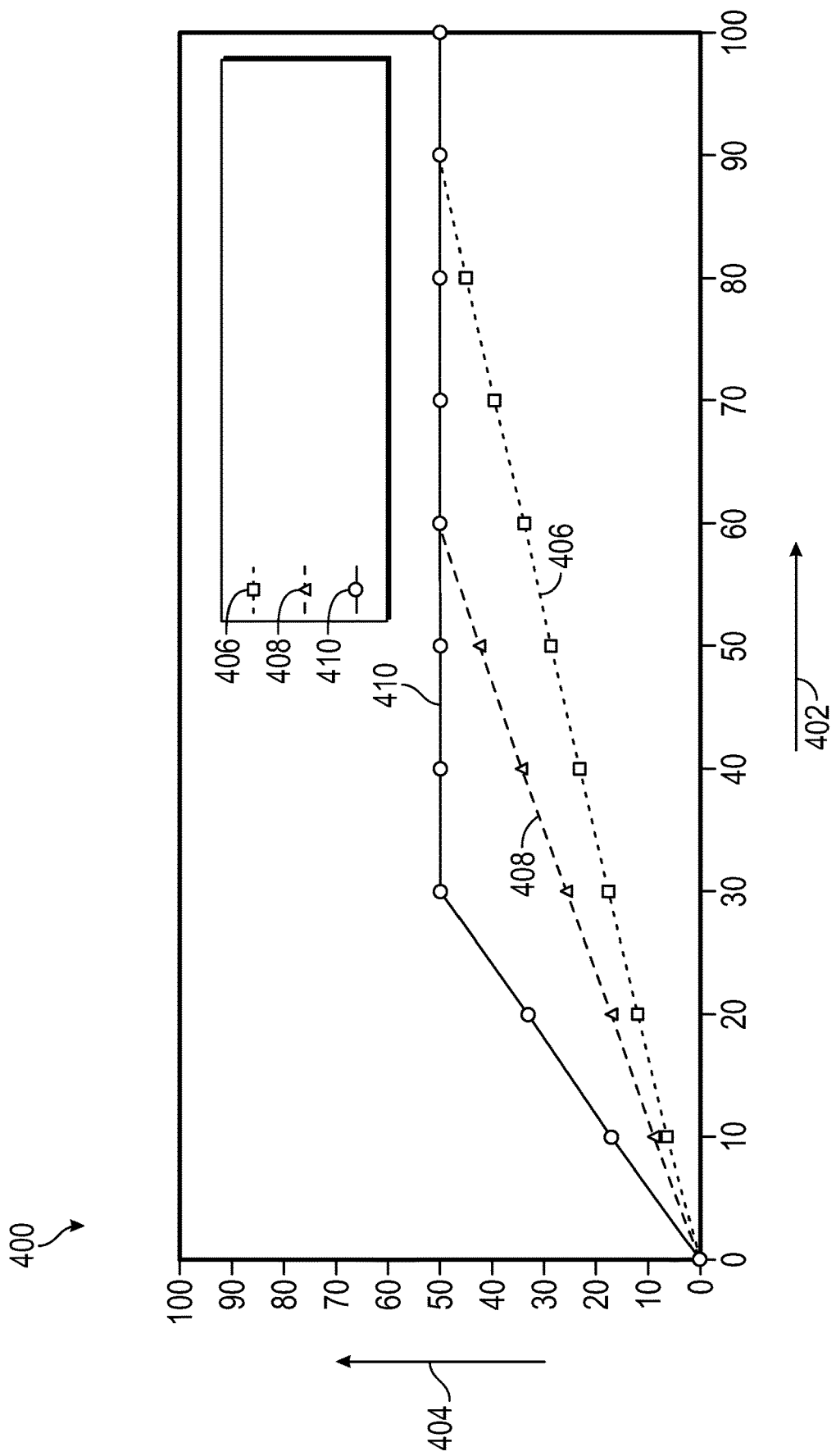
Figure 5:
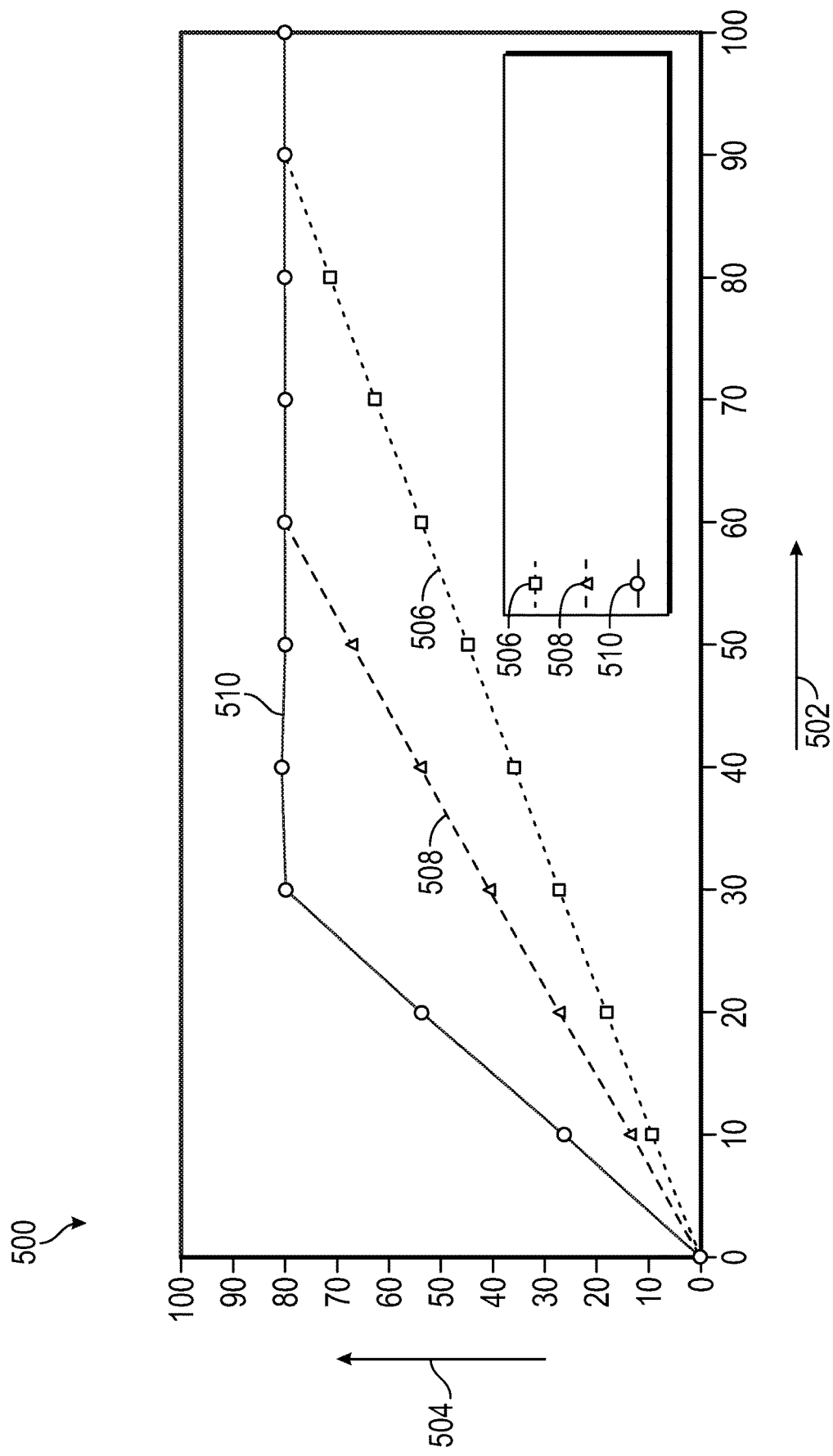

With reference to FIGS. 3-5, depictions are provided of exemplary implementations of the process 200 of FIG. 2, in accordance with exemplary embodiments. Specifically, the exemplary implementations of FIGS. 3-5 incorporate different gains for the trailer braking in accordance with the process 200 of FIG. 2, in accordance with exemplary embodiments.

First, FIG. 3 provides a first graphical illustration 300 of a first implementation of the process 200, in which a first gain is implemented. In certain embodiments, this first gain setting comprises a gain setting of three (3) of trailer braking corresponding to brake pedal position for the vehicle 100. As shown in FIG. 3, the first graphical illustration 300 has an x-axis 302 comprising percent pedal position ("% pedal position", comprising a percentage of the maximum brake pedal position at which the brake pedal 107 of FIG. 1 is currently positioned as a result of engagement of the brake pedal by the driver of the vehicle), and a y-axis 304 comprising trailer brake duty cycle (i.e., comprising the duty cycle of the trailer braking system 166 of FIG. 1).

As shown in FIG. 3, the trailer brake duty cycle may have a number of different functional relationships based on the percent pedal position, based on the deceleration range for the vehicle. Specifically, in one exemplary embodiment, the functional relationships may include the following (in various embodiments, among other possible functional relationships): (i) when the vehicle deceleration is in a low range, the trailer brake duty cycle follows a first function 306 with respect to the percent pedal position; (ii) when the vehicle deceleration is in a medium range, the trailer brake duty cycle follows a second function 308 with respect to the percent pedal position; and (iii) when the vehicle deceleration is in a high range, the trailer brake duty cycle follows a third function 310 with respect to the percent pedal position. In various embodiments, the "low", "medium", and "high" vehicle deceleration ranges correspond to the exemplary deceleration ranges described above in connection with step 222 and the table 224 of FIG. 2.

As shown in FIG. 3, when the vehicle deceleration is in the low range, the first function 306 provides that the trailer brake duty cycle linearly (i.e., proportionally) increases with the percent pedal position up until the percent pedal position is equal to approximately 90 percent (90%), after which the trailer brake duty cycle levels off at approximately thirty percent (30%). Also as shown in FIG. 3, when the vehicle deceleration is in the medium range, the second function 308 provides that the trailer brake duty cycle linearly (i.e., proportionally) increases with the percent pedal position (which a relatively larger slope as compared with the first function 306 described above) up until the percent pedal position is equal to approximately sixty percent (60%), after which the trailer brake duty cycle levels off at approximately thirty percent (30%). In addition, also as shown in FIG. 3, when the vehicle deceleration is in the high range, the third function 310 provides that the trailer brake duty cycle linearly (i.e., proportionally) increases with the percent pedal position (which a relatively larger slope as compared with both the first function 306 and the second function 308 described above) up until the percent pedal position is equal to approximately thirty percent (30%), after which the trailer brake duty cycle levels off at approximately thirty percent (30%).

Accordingly, as illustrated in FIG. 3 in accordance with an exemplary embodiment, the trailer brake duty cycle increases more rapidly, and reaches its peak value more rapidly, as the vehicle deceleration value increases. In various embodiments, this provides additional and more immediate trailer braking when more significant trailer braking is needed on an urgent basis (i.e., when the vehicle deceleration is relatively larger), but otherwise provides for a potentially smoother braking experience when more significant trailer braking is not need on an urgent basis (i.e., when the vehicle deceleration is relatively smaller).

Next, FIG. 4 provides a second graphical illustration 400 of a second implementation of the process 200, in which a second gain is implemented. In certain embodiments, this second gain setting comprises a gain setting of five (5) of trailer braking corresponding to brake pedal position for the vehicle 100. As shown in FIG. 4, the second graphical illustration 400 has an x-axis 402 comprising percent pedal position ("% pedal position", comprising a percentage of the maximum brake pedal position at which the brake pedal 107 of FIG. 1 is currently positioned as a result of engagement of the brake pedal by the driver of the vehicle), and a y-axis 404 comprising trailer brake duty cycle (i.e., comprising the duty cycle of the trailer braking system 166 of FIG. 1).

As shown in FIG. 4, the trailer brake duty cycle has three different functional relationships based on the percent pedal position, based on the deceleration range for the vehicle. Specifically: (i) when the vehicle deceleration is in a low range, the trailer brake duty cycle follows a first function 406 with respect to the percent pedal position; (ii) when the vehicle deceleration is in a medium range, the trailer brake duty cycle follows a second function 408 with respect to the percent pedal position; and (iii) when the vehicle deceleration is in a high range, the trailer brake duty cycle follows a third function 410 with respect to the percent pedal position. In various embodiments, the "low", "medium", and "high" vehicle deceleration ranges correspond to the exemplary deceleration ranges described above in connection with step 222 and the table 224 of FIG. 2.

As shown in FIG. 4, when the vehicle deceleration is in the low range, the first function 406 provides that the trailer brake duty cycle linearly (i.e., proportionally) increases with the percent pedal position up until the percent pedal position is equal to approximately 90 percent (90%), after which the trailer brake duty cycle levels off at approximately fifty percent (50%). Also as shown in FIG. 4, when the vehicle deceleration is in the medium range, the second function 408 provides that the trailer brake duty cycle linearly (i.e., proportionally) increases with the percent pedal position (which a relatively larger slope as compared with the first function 406 described above) up until the percent pedal position is equal to approximately sixty percent (60%), after which the trailer brake duty cycle levels off at approximately fifty percent (50%). In addition, also as shown in FIG. 4, when the vehicle deceleration is in the high range, the third function 410 provides that the trailer brake duty cycle linearly (i.e., proportionally) increases with the percent pedal position (which a relatively larger slope as compared with both the first function 406 and the second function 408 described above) up until the percent pedal position is equal to approximately thirty percent (30%), after which the trailer brake duty cycle levels off at approximately fifty percent (50%).

Accordingly, as illustrated in FIG. 4 in accordance with an exemplary embodiment, the trailer brake duty cycle increases more rapidly, and reaches its peak value more rapidly, as the vehicle deceleration value increases. In various embodiments, this provides additional and more immediate trailer braking when more significant trailer braking is needed on an urgent basis (i.e., when the vehicle deceleration is relatively larger), but otherwise provides for a potentially smoother braking experience when more significant trailer braking is not need on an urgent basis (i.e., when the vehicle deceleration is relatively smaller).

Also as illustrated in FIG. 4, with a relatively larger gain of FIG. 4 as compared with the relatively smaller gain of FIG. 3, a higher level of trailer brake duty cycle is provided in the second implementation of FIG. 4 as compared with the first implementation of FIG. 3. For example, each of the functions 406, 408, and 410 of FIG. 4 are effectively "shifted" higher with respect to the corresponding functions 306, 308, and 310 of FIG. 3. In addition, each of the functions 406, 408, and 410 of FIG. 4 reach a higher maximum value/levelling off value of approximately fifty percent (50%) as depicted in FIG. 4, as compared with a relatively lower maximum value/levelling value of approximately thirty percent (30%) as depicted in FIG. 3 for the corresponding functions 306, 308, and 310 of FIG. 3.

Finally, FIG. 5 provides a third graphical illustration 500 of a third implementation of the process 200, in which a third gain is implemented. In certain embodiments, this third gain setting comprises a gain setting of eight (8) of trailer braking corresponding to brake pedal position for the vehicle 100. As shown in FIG. 5, the third graphical illustration 500 has an x-axis 502 comprising percent pedal position ("% pedal position", comprising a percentage of the maximum brake pedal position at which the brake pedal 107 of FIG. 1 is currently positioned as a result of engagement of the brake pedal by the driver of the vehicle), and a y-axis 504 comprising trailer brake duty cycle (i.e., comprising the duty cycle of the trailer braking system 166 of FIG. 1).

As shown in FIG. 5, the trailer brake duty cycle has three different functional relationships based on the percent pedal position, based on the deceleration range for the vehicle. Specifically: (i) when the vehicle deceleration is in a low range, the trailer brake duty cycle follows a first function 506 with respect to the percent pedal position; (ii) when the vehicle deceleration is in a medium range, the trailer brake duty cycle follows a second function 508 with respect to the percent pedal position; and (iii) when the vehicle deceleration is in a high range, the trailer brake duty cycle follows a third function 510 with respect to the percent pedal position. In various embodiments, the "low", "medium", and "high" vehicle deceleration ranges correspond to the exemplary deceleration ranges described above in connection with step 222 and the table 224 of FIG. 2.

As shown in FIG. 5, when the vehicle deceleration is in the low range, the first function 506 provides that the trailer brake duty cycle linearly (i.e., proportionally) increases with the percent pedal position up until the percent pedal position is equal to approximately 90 percent (90%), after which the trailer brake duty cycle levels off at approximately eighty percent (80%). Also as shown in FIG. 5, when the vehicle deceleration is in the medium range, the second function 508 provides that the trailer brake duty cycle linearly (i.e., proportionally) increases with the percent pedal position (which a relatively larger slope as compared with the first function 506 described above) up until the percent pedal position is equal to approximately sixty percent (60%), after which the trailer brake duty cycle levels off at approximately eighty percent (80%). In addition, also as shown in FIG. 5, when the vehicle deceleration is in the high range, the third function 510 provides that the trailer brake duty cycle linearly (i.e., proportionally) increases with the percent pedal position (which a relatively larger slope as compared with both the first function 506 and the second function 508 described above) up until the percent pedal position is equal to approximately thirty percent (30%), after which the trailer brake duty cycle levels off at approximately eighty percent (80%).

Accordingly, as illustrated in FIG. 5 in accordance with an exemplary embodiment, the trailer brake duty cycle increases more rapidly, and reaches its peak value more rapidly, as the vehicle deceleration value increases. In various embodiments, this provides additional and more immediate trailer braking when more significant trailer braking is needed on an urgent basis (i.e., when the vehicle deceleration is relatively larger), but otherwise provides for a potentially smoother braking experience when more significant trailer braking is not need on an urgent basis (i.e., when the vehicle deceleration is relatively smaller).

Also as illustrated in FIG. 5, with a relatively larger gain of FIG. 5 as compared with the relatively smaller gains of FIG. 3 and FIG. 4, a higher level of trailer brake duty cycle is provided in the first third implementation of FIG. 5 as compared with the first implementation of FIG. 3 and the second implementation of FIG. 4. For example, each of the functions 506, 508, and 510 of FIG. 5 are effectively "shifted" higher with respect to both the corresponding functions 306, 308, and 310 of FIG. 3 and the corresponding functions 406, 408, and 410 of FIG. 4. In addition, each of the functions 506, 508, and 510 of FIG. 5 reach a higher maximum value/levelling off value of approximately eighty percent (80%) as depicted in FIG. 5, as compared with a relatively lower maximum value/levelling value of approximately fifty percent (50%) as depicted in FIG. 5 for the corresponding functions 406, 408, and 410 of FIG. 4.

As illustrated in FIGS. 3-5, in various embodiments the adaptive trailer brake control of the process 200 provides a relatively larger immediate trailer braking increase when the vehicle deceleration is in a relatively lower range. Specifically, as illustrated in FIGS. 3-5, in various embodiments the process 200 provides trailer braking (e.g., trailer brake duty cycle percent) that is proportional (e.g., linear) with respect to vehicle brake pedal position at relatively higher speeds, while smoothing out the braking experience at relatively higher speeds. In addition, also as illustrated in FIGS. 3-5, in various embodiments the adaptive trailer brake control of the process 200 is implemented in this manner with corresponding greater trailer braking across all vehicle deceleration levels when the trailer braking gain is greater.

For example, per the discussion above, each of the exemplary implementations of FIGS. 3-5 provide for the dynamically control of vehicle trailer braking via dynamic control of the trailer brake duty cycle to be proportional to the brake pedal position percentage up to a predetermined brake pedal position percentage, with a slope that is dependent upon the deceleration of the vehicle (provided that the conditions for adaptive trailer brake control as set forth above in connection with FIG. 2 are satisfied). In addition, each of the exemplary implementations of FIGS. 3-5 further provide for the dynamically control of vehicle trailer braking via dynamic control of the trailer brake duty cycle to be proportional to the brake pedal position percentage up to the predetermined brake pedal position percentage to reach a maximum trailer brake duty cycle, with the slope that is dependent upon the deceleration of the vehicle, and wherein the maximum trailer brake duty cycle is based on the trailer braking gain (e.g., determined in step 206 of the process 200 of FIG. 2).

Accordingly, methods, systems, and vehicles are provided for control trailer braking for trailers that are coupled to vehicles. In various embodiments, the methods, systems, and vehicles provide additional and more immediate trailer braking when more significant trailer braking is needed on an urgent basis (i.e., when the vehicle deceleration is relatively larger), but otherwise provides for a potentially smoother braking experience when more significant trailer braking is not need on an urgent basis (i.e., when the vehicle deceleration is relatively smaller).

It will be appreciated that the systems, vehicles, and methods may vary from those depicted in the Figures and described herein. For example, the vehicle 100 of FIG. 1, the control system 102 and the braking system 106 thereof, the trailer 160 and the braking system 166 thereof, and/or components of the vehicle 100 and/or the trailer 160 of FIG. 1 may vary in different embodiments. It will similarly be appreciated that the steps of the process 200 may differ from that depicted in FIG. 2, and/or that various steps of the process 200 may occur concurrently and/or in a different order than that depicted in FIG. 2. It will similarly be appreciated that the implementations of FIGS. 3-5 may also differ in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   obtaining sensor data via one or more sensors of a vehicle coupled to a trailer, the sensor data including:
   a measure of engagement of a brake pedal of the vehicle;
   a brake pedal position percentage of the brake pedal of the vehicle;
   a steering angle of a steering wheel of the vehicle;
   a speed of the vehicle;
   a grade of a path on which the vehicle is travelling; and
   a deceleration of the vehicle; and
   dynamically controlling braking of the trailer, via instructions provided by a processor of the vehicle to a braking system of the trailer, based on the measure of engagement of the brake pedal, the brake pedal position percentage of the brake pedal of the vehicle, the steering angle of a steering wheel of the vehicle, the speed of the vehicle, the grade of the path on which the vehicle is travelling, and the deceleration of the vehicle using a dynamic trailer brake gain as percentage of vehicle braking, including by:
  initially controlling braking of the trailer by utilizing, as the trailer brake gain, an initial trailer brake gain setting as an initial percentage of vehicle braking;
  determining whether a first condition is satisfied, namely, when the steering angle is less than a first predetermined threshold;
  determining whether a second condition is satisfied, namely, when the grade of the road or path is less than a second predetermined threshold;
  determining whether a third condition is satisfied, namely, when the vehicle speed is less than a third predetermined threshold;
  maintaining control of the braking of the trailer based on the initial trailer brake gain setting, when one or more of the first condition, the second condition, or the third condition are not satisfied; and
  adjusting control of the braking of the trailer, when each of the first condition, the second condition, and the third condition are satisfied, via an adjustment to the trailer brake gain that is based on a deceleration of the vehicle.

2. The method of claim 1, wherein:
the first predetermined threshold is equal to plus or minus thirty degrees;
the second predetermined threshold is equal to plus or minus three degrees of grade; and
the third predetermined threshold is equal to forty kilometers per hour.

3. The method of claim 1, further comprising:
determining, via the processor using the sensor data, whether an alert is provided as to a possible contact with another object when a time to contact with the object is less than a predetermined time threshold that is equal to approximately three seconds; and
terminating the adjustment of the trailer brake gain when it is determined that the time to contact with the object is less than the predetermined time threshold.

4. The method of claim 1, wherein the adjustment of the trailer brake gain is based on a look-up table that is utilized by the processor and stored in a memory of the vehicle, the look-up table providing a plurality of different deceleration ranges and brake pedal positions, such that trailer brake duty cycle increases more rapidly, and reaches its peak value more rapidly, as the vehicle deceleration value increases in accordance with the look-up table.

5. The method of claim 1, wherein the adjustment of the trailer brake gain is based on a look-up table that is utilized by the processor and stored in a memory of the vehicle, the look-up table providing a plurality of different deceleration ranges and brake pedal positions, including:
  when the vehicle deceleration is in a low range that is less than a first predetermined deceleration threshold, the adjustment is represented by a ninety percent brake pedal position corresponding to a one hundred percent trailer braking force;
  when the vehicle deceleration is in a medium range that is greater than the first predetermined deceleration threshold but less than a second predetermined deceleration threshold, the adjustment is represented by a sixty percent brake pedal position corresponding to a one hundred percent trailer braking force; and
  when the vehicle deceleration is in a high range that is greater than the second predetermined deceleration threshold, the adjustment is represented by a thirty percent brake pedal position corresponding to a one hundred percent trailer braking force.

6. The method of claim 1, wherein the adjustment of the trailer brake gain is based on a look-up table that is utilized by the processor and stored in a memory of the vehicle, the look-up table providing a plurality of different deceleration ranges and brake pedal positions, including:
  when the vehicle deceleration is in a low range that is less than a first predetermined deceleration threshold, the adjustment is represented by a first function with respect to the percent pedal position;
  when the vehicle deceleration is in a medium range that is greater than the first predetermined deceleration threshold but less than a second predetermined deceleration threshold, the adjustment is represented by a second function with respect to the percent pedal position; and
  when the vehicle deceleration is in a high range that is greater than the second predetermined deceleration threshold, the adjustment is represented by a third function with respect to the percent pedal position.

7. The method of claim 6, wherein:
the look-up table has a gain setting of three of trailer braking corresponding to brake pedal position for the vehicle;
when the vehicle deceleration is in the low range, the adjustment is represented by the first function with respect to the percent pedal position, wherein trailer brake duty cycle linearly increases with the percent pedal position with a first slope up until the percent pedal position is equal to approximately ninety percent, after which the trailer brake duty cycle levels off at approximately thirty percent;
when the vehicle deceleration is in the medium range, the adjustment is represented by the second function with respect to the percent pedal position, wherein the trailer brake duty cycle linearly increases with the percent pedal position with a second slope that is greater than the first slope up until the percent pedal position is equal to approximately sixty percent, after which the trailer brake duty cycle levels off at approximately thirty percent; and
when the vehicle deceleration is in the high range, the adjustment is represented by the third function with respect to the percent pedal position, wherein the trailer brake duty cycle linearly increases with the percent pedal position with a third slope that is greater than the second slope up until the percent pedal position is equal to approximately thirty percent, after which the trailer brake duty cycle levels off at approximately thirty percent.

8. The method of claim 6, wherein:
the look-up table has a gain setting of five of trailer braking corresponding to brake pedal position for the vehicle;
when the vehicle deceleration is in the low range, the adjustment is represented by the first function with respect to the percent pedal position, wherein trailer brake duty cycle linearly increases with the percent pedal position with a first slope up until the percent pedal position is equal to approximately ninety percent, after which the trailer brake duty cycle levels off at approximately fifty percent;

when the vehicle deceleration is in the medium range, the adjustment is represented by the second function with respect to the percent pedal position, wherein the trailer brake duty cycle linearly increases with the percent pedal position with a second slope that is greater than the first slope up until the percent pedal position is equal to approximately sixty percent, after which the trailer brake duty cycle levels off at approximately fifty percent; and when the vehicle deceleration is in the high range, the adjustment is represented by the third function with respect to the percent pedal position, wherein the trailer brake duty cycle linearly increases with the percent pedal position with a third slope that is greater than the second slope up until the percent pedal position is equal to approximately thirty percent, after which the trailer brake duty cycle levels off at approximately fifty percent.

9. The method of claim 6, wherein:

the look-up table has a gain setting of eight of trailer braking corresponding to brake pedal position for the vehicle;

when the vehicle deceleration is in the low range, the adjustment is represented by the first function with respect to the percent pedal position, wherein trailer brake duty cycle linearly increases with the percent pedal position with a first slope up until the percent pedal position is equal to approximately ninety percent, after which the trailer brake duty cycle levels off at approximately eighty percent;

when the vehicle deceleration is in the medium range, the adjustment is represented by the second function with respect to the percent pedal position, wherein the trailer brake duty cycle linearly increases with the percent pedal position with a second slope that is greater than the first slope up until the percent pedal position is equal to approximately sixty percent, after which the trailer brake duty cycle levels off at approximately eighty percent; and when the vehicle deceleration is in the high range, the adjustment is represented by the third function with respect to the percent pedal position, wherein the trailer brake duty cycle linearly increases with the percent pedal position with a third slope that is greater than the second slope up until the percent pedal position is equal to approximately thirty percent, after which the trailer brake duty cycle levels off at approximately eighty percent.

10. A system comprising:

one or more sensors configured to obtain sensor data for a vehicle coupled to a trailer, the sensor data including:
a measure of engagement of a brake pedal of the vehicle;
a brake pedal position percentage of the brake pedal of the vehicle;
a steering angle of a steering wheel of the vehicle;
a speed of the vehicle;
a grade of a path on which the vehicle is travelling; and
a deceleration of the vehicle; and a processor that is coupled to the one or more sensors and that is configured to at least facilitate dynamically controlling braking of the trailer, via instructions provided by the processor to a braking system of the trailer, based on the measure of engagement of the brake pedal, the brake pedal position percentage of the brake pedal of the vehicle, the steering angle of a steering wheel of the vehicle, the speed of the vehicle, the grade of the path on which the vehicle is travelling, and the deceleration of the vehicle using a dynamic trailer brake gain as percentage of vehicle braking, including by:
initially controlling braking of the trailer by utilizing, as the trailer brake gain, an initial trailer brake gain setting as an initial percentage of vehicle braking;
determining whether a first condition is satisfied, namely, when the steering angle is less than a first predetermined threshold;
determining whether a second condition is satisfied, namely, when the grade of the road or path is less than a second predetermined threshold;
determining whether a third condition is satisfied, namely, when the vehicle speed is less than a third predetermined threshold;
maintaining control of the braking of the trailer based on the initial trailer brake gain setting, when one or more of the first condition, the second condition, or the third condition are not satisfied; and
adjusting control of the braking of the trailer, when each of the first condition, the second condition, and the third condition are satisfied, via an adjustment to the trailer brake gain that is based on a deceleration of the vehicle.

11. The system of claim 10, wherein:

the first predetermined threshold is equal to plus or minus thirty degrees;

the second predetermined threshold is equal to plus or minus three degrees of grade; and the third predetermined threshold is equal to forty kilometers per hour.

12. The system of claim 10, wherein the processor is further configured to at least facilitate:

determining, using the sensor data, whether an alert is provided as to a possible contact with another object when a time to contact with the object is less than a predetermined time threshold that is equal to approximately three seconds; and terminating the adjustment of the trailer brake gain when it is determined that the time to contact with the object is less than the predetermined time threshold.

13. The system of claim 10, wherein the adjustment of the trailer brake gain is based on a look-up table that is utilized by the processor and stored in a memory of the vehicle, the look-up table providing a plurality of different deceleration ranges and brake pedal positions, such that trailer brake duty cycle increases more rapidly, and reaches its peak value more rapidly, as the vehicle deceleration value increases in accordance with the look-up table.

14. The system of claim 10, wherein the adjustment of the trailer brake gain is based on a look-up table that is utilized by the processor and stored in a memory of the vehicle, the look-up table providing a plurality of different deceleration ranges and brake pedal positions, including:

when the vehicle deceleration is in a low range that is less than a first predetermined deceleration threshold, the adjustment is represented by a ninety percent brake pedal position corresponding to a one hundred percent trailer braking force;

when the vehicle deceleration is in a medium range that is greater than the first predetermined deceleration threshold but less than a second predetermined deceleration threshold, the adjustment is represented by a sixty percent brake pedal position corresponding to a one hundred percent trailer braking force; and when the vehicle deceleration is in a high range that is greater than the second predetermined deceleration threshold, the adjustment is represented by a thirty percent brake pedal position corresponding to a one hundred percent trailer braking force.

15. The system of claim 10, wherein the adjustment of the trailer brake gain is based on a look-up table that is utilized by the processor and stored in a memory of the vehicle, the look-up table providing a plurality of different deceleration ranges and brake pedal positions, including:
when the vehicle deceleration is in a low range that is less than a first predetermined deceleration threshold, the adjustment is represented by a first function with respect to the percent pedal position;
when the vehicle deceleration is in a medium range that is greater than the first predetermined deceleration threshold but less than a second predetermined deceleration threshold, the adjustment is represented by a second function with respect to the percent pedal position; and
when the vehicle deceleration is in a high range that is greater than the second predetermined deceleration threshold, the adjustment is represented by a third function with respect to the percent pedal position.

16. The system of claim 15, wherein:
the look-up table has a gain setting of three of trailer braking corresponding to brake pedal position for the vehicle;
when the vehicle deceleration is in the low range, the adjustment is represented by the first function with respect to the percent pedal position, wherein trailer brake duty cycle linearly increases with the percent pedal position with a first slope up until the percent pedal position is equal to approximately ninety percent, after which the trailer brake duty cycle levels off at approximately thirty percent;
when the vehicle deceleration is in the medium range, the adjustment is represented by the second function with respect to the percent pedal position, wherein the trailer brake duty cycle linearly increases with the percent pedal position with a second slope that is greater than the first slope up until the percent pedal position is equal to approximately sixty percent, after which the trailer brake duty cycle levels off at approximately thirty percent; and
when the vehicle deceleration is in the high range, the adjustment is represented by the third function with respect to the percent pedal position, wherein the trailer brake duty cycle linearly increases with the percent pedal position with a third slope that is greater than the second slope up until the percent pedal position is equal to approximately thirty percent, after which the trailer brake duty cycle levels off at approximately thirty percent.

17. The system of claim 15, wherein:
the look-up table has a gain setting of five of trailer braking corresponding to brake pedal position for the vehicle;
when the vehicle deceleration is in the low range, the adjustment is represented by the first function with respect to the percent pedal position, wherein trailer brake duty cycle linearly increases with the percent pedal position with a first slope up until the percent pedal position is equal to approximately ninety percent, after which the trailer brake duty cycle levels off at approximately fifty percent;
when the vehicle deceleration is in the medium range, the adjustment is represented by the second function with respect to the percent pedal position, wherein the trailer brake duty cycle linearly increases with the percent pedal position with a second slope that is greater than the first slope up until the percent pedal position is equal to approximately sixty percent, after which the trailer brake duty cycle levels off at approximately fifty percent; and
when the vehicle deceleration is in the high range, the adjustment is represented by the third function with respect to the percent pedal position, wherein the trailer brake duty cycle linearly increases with the percent pedal position with a third slope that is greater than the second slope up until the percent pedal position is equal to approximately thirty percent, after which the trailer brake duty cycle levels off at approximately fifty percent.

18. The system of claim 15, wherein:
the look-up table has a gain setting of eight of trailer braking corresponding to brake pedal position for the vehicle;
when the vehicle deceleration is in the low range, the adjustment is represented by the first function with respect to the percent pedal position, wherein trailer brake duty cycle linearly increases with the percent pedal position with a first slope up until the percent pedal position is equal to approximately ninety percent, after which the trailer brake duty cycle levels off at approximately eighty percent;
when the vehicle deceleration is in the medium range, the adjustment is represented by the second function with respect to the percent pedal position, wherein the trailer brake duty cycle linearly increases with the percent pedal position with a second slope that is greater than the first slope up until the percent pedal position is equal to approximately sixty percent, after which the trailer brake duty cycle levels off at approximately eighty percent; and
when the vehicle deceleration is in the high range, the adjustment is represented by the third function with respect to the percent pedal position, wherein the trailer brake duty cycle linearly increases with the percent pedal position with a third slope that is greater than the second slope up until the percent pedal position is equal to approximately thirty percent, after which the trailer brake duty cycle levels off at approximately eighty percent.

19. A vehicle comprising:
a body configured to be coupled to a trailer having a trailer braking system;
a brake pedal;
one or more sensors configured to obtain sensor data for the vehicle, the sensor data including:
a measure of engagement of a brake pedal of the vehicle;
a brake pedal position percentage of the brake pedal of the vehicle;
a steering angle of a steering wheel of the vehicle;
a speed of the vehicle;
a grade of a path on which the vehicle is travelling; and
a deceleration of the vehicle; and
a processor that is coupled to the one or more sensors and that is configured to at least facilitate dynamically controlling braking of the trailer, via instructions provided by the processor to a braking system of the trailer, based on the measure of engagement of the brake pedal, the brake pedal position percentage of the brake pedal of the vehicle, the steering angle of a steering wheel of the vehicle, the speed of the vehicle, the grade of the path on which the vehicle is travelling, and the deceleration of the vehicle using a dynamic trailer brake gain as percentage of vehicle braking, including by:
- initially controlling braking of the trailer by utilizing, as the trailer brake gain, an initial trailer brake gain setting as an initial percentage of vehicle braking;
- determining whether a first condition is satisfied, namely, when the steering angle is less than a first predetermined threshold;
- determining whether a second condition is satisfied, namely, when the grade of the road or path is less than a second predetermined threshold;
- determining whether a third condition is satisfied, namely, when the vehicle speed is less than a third predetermined threshold;
- maintaining control of the braking of the trailer based on the initial trailer brake gain setting, when one or more of the first condition, the second condition, or the third condition are not satisfied; and
- adjusting control of the braking of the trailer, when each of the first condition, the second condition, and the third condition are satisfied, via an adjustment to the trailer brake gain that is based on a deceleration of the vehicle.

20. The vehicle of claim 19, wherein the adjustment of the trailer brake gain is based on a look-up table that is utilized by the processor and stored in a memory of the vehicle, the look-up table providing a plurality of different deceleration ranges and brake pedal positions, such that trailer brake duty cycle increases more rapidly, and reaches its peak value more rapidly, as the vehicle deceleration value increases in accordance with the look-up table.

* * * * *